United States Patent [19]

Werth et al.

[11] Patent Number: 4,504,970
[45] Date of Patent: Mar. 12, 1985

[54] TRAINING CONTROLLER FOR PATTERN PROCESSING SYSTEM

[75] Inventors: Larry J. Werth, Eagan; Larry G. Paulson, Moundsview, both of Minn.

[73] Assignee: Pattern Processing Technologies, Inc., Minneapolis, Minn.

[21] Appl. No.: 464,350

[22] Filed: Feb. 7, 1983

[51] Int. Cl.³ .............................................. G06K 9/70
[52] U.S. Cl. ..................................... 382/14; 364/513; 382/37
[58] Field of Search .................. 382/7, 10, 14, 15, 37, 382/41, 49; 364/513, 488–491; 358/101, 107

[56] References Cited

U.S. PATENT DOCUMENTS

| | | | |
|---|---|---|---|
| 3,074,050 | 1/1963 | Schultz | 340/146.3 |
| 3,167,746 | 1/1965 | Reines et al. | 340/146.3 |
| 3,262,099 | 7/1966 | Skiko et al. | 382/37 |
| 3,504,164 | 3/1970 | Farrell et al. | 235/150 |
| 3,539,994 | 11/1970 | Clapper | 340/146.3 |
| 3,579,252 | 5/1971 | Goodman | 178/7.85 |
| 3,643,215 | 2/1972 | Ingham et al. | 382/14 |
| 3,737,852 | 6/1973 | Robinson | 340/146.3 WD |
| 3,816,722 | 6/1974 | Sakoe et al. | 235/152 |
| 3,846,752 | 11/1974 | Nakano et al. | 340/146.3 Q |
| 3,879,728 | 4/1975 | Wolff | 343/5 MM |
| 3,909,785 | 9/1975 | Howells | 382/37 |
| 4,014,000 | 3/1977 | Uno et al. | 340/146.3 MA |
| 4,028,673 | 6/1977 | Taylor et al. | 340/136.3 R |
| 4,032,889 | 6/1977 | Nassimbene | 340/146.3 E |
| 4,110,737 | 8/1978 | Fahey | 340/146.3 Q |
| 4,164,728 | 8/1979 | Marsh | 340/146.3 Q |
| 4,180,800 | 12/1979 | Isshiki et al. | 382/37 |
| 4,254,400 | 3/1981 | Yoda et al. | 340/146.3 MA |
| 4,277,775 | 7/1981 | Nally et al. | 340/146.3 Q |
| 4,286,330 | 8/1981 | Isaacson | 382/49 |
| 4,295,121 | 10/1981 | Enser et al. | 340/146.3 MA |
| 4,295,198 | 10/1981 | Copeland et al. | 364/515 |
| 4,305,130 | 12/1981 | Kelley et al. | 364/513 |

Primary Examiner—Leo H. Boudreau
Attorney, Agent, or Firm—Kinney & Lange

[57] ABSTRACT

A pattern processing system associates image input patterns with desired response codes. The image input is stored in an image buffer as an addressable array of sample values. An address sequencer provides an address stream containing a plurality of interleaved sequences of addresses to the image buffer and to a read/write response memory. The next address of each sequence provided by the address sequencer is based upon the current address of that sequence and the state of the sample value stored in the image buffer at the location corresponding to the current address. Once the address sequencer repeats an address in a sequence, that address sequence is in a repetitive address loop as long as the image stored in the image buffer remains constant. The address loop continues to be generated, since the address sequencer always produces the same next address for that sequence based upon the same current address and the same sample value stored at that current address. During a training mode, a pattern to be recognized is supplied to the image buffer and a training code representing a desired response is written into the response memory at selected locations that correspond to addresses in the address loop being generated. During a later recognition mode, when the same pattern is supplied to the image buffer, the same address loop is again generated. The previously stored training codes are read from the response memory. A response detector provides a response code output representative of the pattern based upon the most frequent code read out from the response memory.

11 Claims, 3 Drawing Figures

TRAINING CONTROLLER FOR PATTERN PROCESSING SYSTEM

REFERENCE TO COPENDING APPLICATIONS

Reference is hereby made to the following copending applications filed on even date with this application and assigned to the same assignee: PATTERN PROCESSING SYSTEM Ser. No. 465,008; ADDRESS SEQUENCER FOR PATTERN PROCESSING SYSTEM Ser. No. 464,588; and RESPONSE DETECTOR FOR PATTERN PROCESSING SYSTEM Ser. No. 464,624.

BACKGROUND OF THE INVENTION

1. Field of the Invention

This invention relates to systems for identifying images.

2. Description of the Prior Art

Digital electronic technology (and particularly digital computers) has changed almost every facet of modern life. In spite of the ever-increasing use of digital technology, life still goes on in an analog fashion. Visual, tactile, and audio images still comprise the bulk of sensory experiences for human beings. Full exploitation of digital technology has been limited by the ability to convert these analog images to digital data and to distinguish the images from each other.

Converters which can digitize a visual image or a series of sounds are now commonplace. Any audio or visual image can be converted to an array of digital data. The problem is, however, to deal with that data in a meaningful manner.

Conventional pattern or image recognition technology has serious speed limitations which in general originate from the use of conventional digital computer processing architecture. This architecture requires the use of serial processing algorithms which do not easily accommodate large amounts of parallel information.

Two methods are commonly used in the prior art to recognize patterns: "template matching" and "feature extraction". In the template matching method, a reference pattern is stored for each response. Each input image is then compared with each reference pattern until a match is found. The number of reference patterns which can be recognized is obviously limited, since substantial time and memory is required to serially search for a match. Because of practical limitations on speed and memory this technology cannot accommodate applications such as natural speech input, visually guided motion, or object tracking.

The feature extraction method attempts to speed up this process. Rather than match an entire image, a small set of features is extracted from the image and compared to a reference set of features. This method can be very complex, as well as time-consuming. An example of the complexity involved in the feature extraction technique is the problem of recognizing a person's face. The difficulty of defining the features of a person's face mathematically and then writing a procedure to recognize these features in an image is overwhelming.

Most conventional approaches to pattern recognition represent information from images in a format which is incompatible with spatial or temporal integration. For example, each image type or image source typically has unique processing algorithms, and the results are not easily combined. In speech, for example, there is generally no common representation of information from the acoustic level to the word, phrase, or semantic levels (temporal integration). As a result, conventional speech recognition methods typically deal with incompatible information formats at every level. Severe processing demands are made in order to accommodate this situation. In the case of multiple visual images (e.g. one image for each primary color or one image from each camera) the descriptive language (information format) from each image is not easily combined to describe a single image identity (spatial integration). In another more obvious example, the descriptive language typically used for the visual image of an object (areas, perimeters, etc.) is certainly incompatable with the descriptive language for the sound which the object may be producing.

Conventional techniques generally require special computer programming to suit each specific application. Each application frequently requires: a detailed analysis of the expected input images to identify their differences; the development of a model (usually mathematical) to define the differences in computer language; and development of generally complex methods to extract the features from the images. This requires skilled personnel to specify and program the complex algorithms on digital computers, and also requires expensive computer programming development facilities. This development process generally must be repeated for each new type of input images.

In those applications where the input images can be totally specified, conventional technology has generally been successful. An example is the field of optical character recognition, which has been the object of considerable research and development over the past twenty-five years. On the other hand, in those applications which deal with time varying images which frequently cannot be prespecified, the conventional technology either has failed to provide technical solutions, or has resulted in extremely complex and expensive systems.

There is a continuing need for improved pattern recognition systems in many fields including speech recognition, robotics, visual recognition systems, and security systems. In general, the existing pattern recognition systems in these fields have had serious shortcomings which have limited their use.

SUMMARY OF THE INVENTION

The pattern processing system of the present invention identifies image input patterns based upon address loops generated when individual values of the input pattern are addressed sequentially. The system includes addressable means for providing an input value representative of the image input pattern in response to an address; address sequencer means for providing an address stream which addresses the addressable means; read/write response memory means which is addressable by the address stream; training controller means for causing a training code associated with the image input pattern to be stored in selected locations of the read/write response memory means which are addressed by the address stream; and response detector means for providing an output response based upon codes which are read out from locations of the response memory means which are addressed by the address stream.

In the present invention, the address stream provided by the address sequencer means contains one or more sequences of addresses. Each address of a sequence is determined by a preceding address of that sequence and the input value which was provided by the addressable means in response to the preceding address. As a result, the sequence will contain an address loop which characterizes the image input pattern.

During a training mode, an image input pattern to be identified is presented. The training controller means causes a training code to be written into selected locations of the read/write response memory means. The training controller means conserves space in the read/write response memory stream by causing the training code to be written at selected intervals in the address stream, rather than at every address of the stream. The training controller means counts occurrences of addresses in each sequence, and permits the training code to be written each time a predetermined number of addresses have occurred in the sequence.

The training controller means also preferably includes means for providing the write/over code which identifies those codes contained in the read/write memory means which can be replaced by a new training code. The training controller compares the write/over code with the code read out from the memory means, and determines whether the training code should be written based upon that comparison.

DETAILED DESCRIPTION OF THE PREFERRED EMBODIMENTS

The pattern processing system of the present invention is applicabile to a wide range of different pattern processing requirements. These include speech recognition, visual image recognition, robotics, and security and surveillance. For convenience and brevity, the following discussion will deal specifically with one advantageous application of the present invention to visual monitoring.

Figure 1:
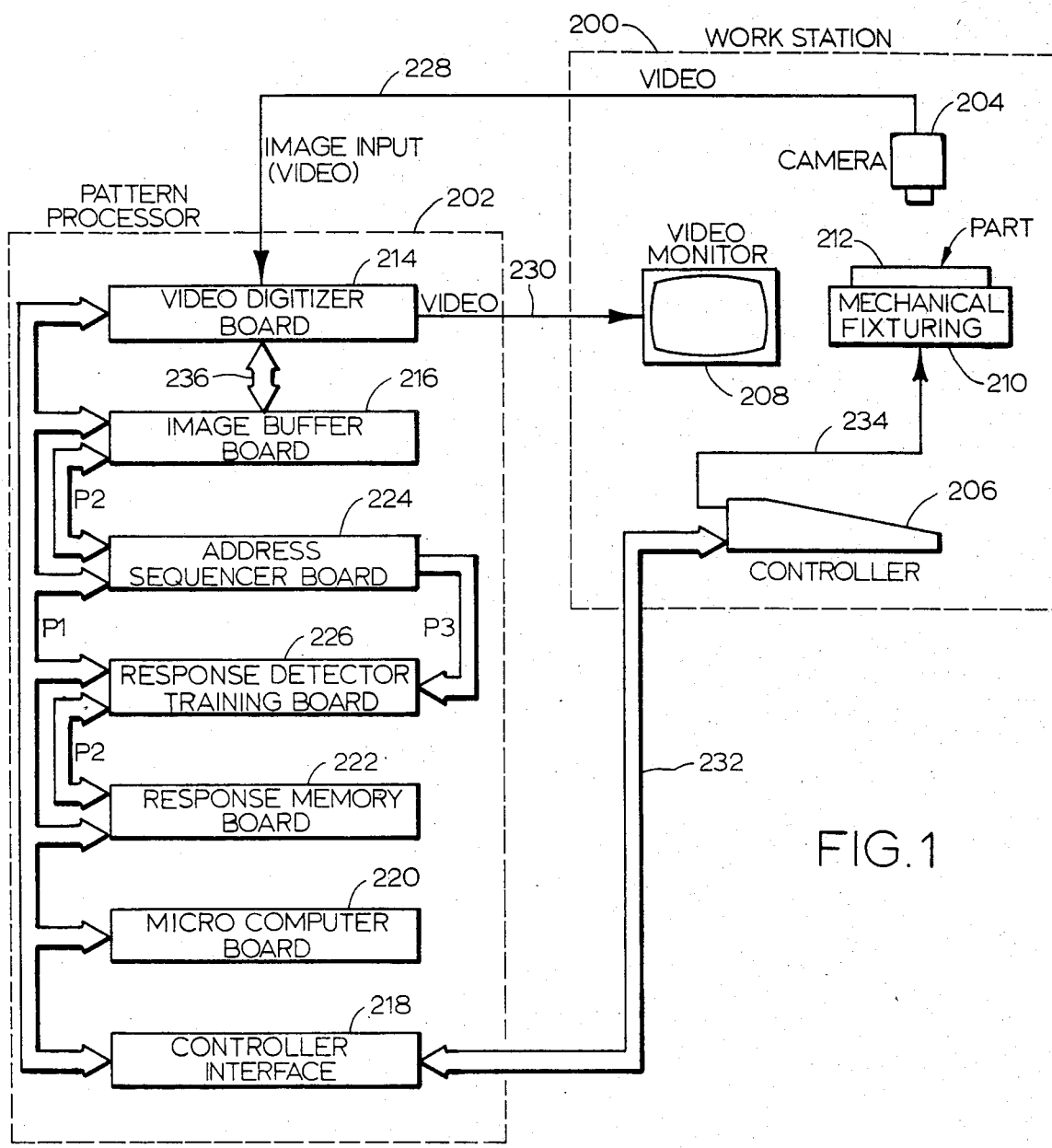
FIG. 1 is an electrical block diagram of a system which utilizes the present invention for video inspection and monitoring.

FIG. 1 shows a video inspection and monitoring system which includes work station 200 and pattern processor 202. Work station 200 includes video camera 204 (which acts as an image source, controller 206, video monitor 208, mechanical fixturing 210, and part 212 (which is manipulated by mechanical fixturing 210 and is monitored by means of video camera 204). Pattern processor 202 includes various printed circuit boards (video digitizer board 214, image buffer board 216, controller interface board 218, microcomputer board 220, response memory boards 222, address sequencer board 224, and response detector/training board 226).

Analog video signals are supplied by video camera 204 to video digitizer board 214 by cable 228. Analog video signals are supplied to video monitor 208 from video digitizer board 214 by cable 230.

Cable 232 provides communication back and forth between controller 206 at work station 200 and controller interface board 218 of pattern processor 202. Controller 206 also provides control signals to mechanical fixturing 210 to control mechanical manipulation of part 212 through control lines 234. Controller 206 preferably includes a keyboard (not shown) which allows the operator to enter data, training codes, and other control information, and to select operating modes.

(1) Work Station 200

The work station 200 operates in one of two modes: a training mode or an operating mode. In the training mode, the operator teaches pattern processor 202 the task or tasks to be performed. Three examples of these tasks are: visual monitoring of a continuous process, visually guided movement, or part inspection for defects. Many applications of the present invention require all three types of tasks to be performed.

In the visual monitoring task, the operator has trained pattern processor 202 to monitor a continuous process or sequence of processes and respond by directing the process, or to detect deviations from normal operation. In many applications, this involves monitoring a high speed process and responding immediately to malfunctions, such as parts becoming jammed.

The operator can train pattern processor 202 for the visual monitoring task as follows:

First, the operator sets up video camera 204 and observes the critical process to be monitored on video monitor 208.

Second, the operator uses controller 206 to place pattern processor 202 in the training mode. The operator selects a training code to designate normal operation and assigns it to pattern processor 202 by entering this information through the keyboard of controller 206.

Third, the operator begins the process and allows normal training codes to be assigned to pattern processor 202 during all normal functioning processes.

When the operating mode is selected, deviations from the normal functions are quickly detected by pattern processor 202 and appropriate action (e.g. in the form of control signals to a mechanical fixturing 210 or a visual or audible annunciator signal) is taken by the controller 206.

For the task of visually guided movement, input patterns can be associated with response codes which command a movement of, for example, part 212, a tool (not shown), or camera 204. In many applications part 212 cannot be adequately positioned by fixturing 210 for subsequent operation such as assembly, or inspection because of limited fixturing tolerances. In those cases, pattern processor 202 can be trained to respond with a code representing the magnitude and direction of the displacement required to correct the positions of part 212 or camera 204.

The operator can choose to train the pattern processor 202 for this task in two ways. First, part 212 can be physically moved through its extremes of anticipated displacement and codes for these displacements and magnitudes can be trained. Second, a program can be written for the controller 206 which uses translation and scaling to position a window over part 212. In this case, movement of the window stimulates movement of the part. The program can automatically assign training codes representing these movements; no physical movement of part 212 is required in this case. During operation, when part 212 becomes positioned within the trained displacement tolerances, part 212 or camera 204 can be directed into position by controller 206.

Since pattern processor 202 can be trained to respond with an object's identity and its displacement at high speeds, pattern processor 202 can provide the necessary responses for controller 206 to identify and track a moving object. In this visually guided movement task, controller 206 maintains a maximum response of the object's identity code by directing movements to compensate for the displacements. One application is to identify and track a moving target in surveillance applications.

In another visually guided movement task, each visual image of an object is trained to respond with a code directing the next move of that object. In this case, visually guided motion can provide proper alignment for mating parts in automated assembly operations or, for example, to move a tool to a specific point on a part. An application could utilize two robot arms, one which holds a camera which visually guides it to observe a precise assembly point and a second robot arm which brings a tool or imaging assembly within the visual field of the camera where it is visually guided through its operation.

The operations of training and response detection of codes for displacement and of training and response detection of codes for part identification or inspection can be kept independent by providing two sets of response memory, response detectors and training controllers using the same address sequencer. This provides additional capacity for response codes and segregates the two functions into a more parallel operation.

For a visual inspection task, such as inspection of a part 212 (e.g. an assembled printed circuit board), the operator can train pattern processor 202 as follows.

First, a correctly completed circuit board is selected to be used as a training part. The operator observes the monitor 208 and places the board in a position to be defined as the reference or registered position; in most cases the center of the field of view of camera 204. The field of view of camera 204 is adjusted so that it is large enough to include the anticipated variations in positioning of the board.

Second, the operator provides a training code to controller 206 which identifies the board in its registered position. If it is the only board to be inspected, the code may only designate that the board is present and in position.

Third, the anticipated limits in board positioning tolerances are provided to controller 206 and a controller program is initiated that automatically trains codes identifying the magnitude and direction of displacements. This program, described earlier, uses scaling and translation to simulate displacements.

Fourth, using the registered position of the board as the reference point, the operator determines the parameters to move to the next inspection point. These parameters may include movements in X, Y and Z axes and the translation and scale factors required to window the next inspection point. The operator observes the monitor and uses the controller to direct movements in the X, Y and Z axes for this manual positioning.

Fifth, the operator provides a training code to identify the new inspection point and proceeds in the same manner as in the third step above. The operator continues until all inspection points have been located and training codes assigned.

Sixth, the operator monitors the initial operation of the inspection task. A simple program in the controller initiates programmed actions during operation depending upon the response codes. These actions include: initiate the inspection task if a part is present, inform the operator of a defective inspection point, initiate a move to the next inspection point, signal when the inspection task is completed, allow the operator to update training for an inspection point if a failure indication is determined by the operator to be an acceptable variation. A defect at an inspection point is determined from the total counts accumulated in the histogram for the code assigned to that point. If the count is less than that observed during training, the point is defective.

(2) Pattern Processor 202

The preferred embodiment of pattern processor 202 shown in FIG. 1 is designed using the standard IEEE-796 (Intel multibus) architecture. Each block drawn in solid lines within pattern processor 202 represents a single printed circuit board. The size of each board and the edge connectors for ports P1 and P2 conform to the IEEE 796 standard. Port P3 is a custom designed port for pattern processor 202.

Port P1 of pattern processor 202 has eighty-six contacts and provides the setup and control communications for pattern processor 202. Controller interface board 218 links controller 206 to port P1 so that individual functions of circuit boards 214, 216, 218, 220, 222, 224 and 226 can be controlled by controller 206.

Port P2 has sixty contacts and provides the high speed access to image buffer board 216 and response memory board 222. This high speed access port is controlled by dedicated logic on address sequencer board 224 and on response detector/training board 226. Each board 224 and 226, therefore, can be considered as having its own high speed port to its dedicated memory.

Port P3 is used to send the address stream generated by address sequencer board 224 to response detector/training board 226.

Ports P1, P2 and P3 are input/output (I/O) edge or pin contacts on the printed circuit boards. In addition to these contacts, there are video input and output connectors on video digitizer board 214 and an IEEE-488 connector on controller interface board 218.

Basically, the internal architecture of pattern processor 202 utilizes the IEEE-796 standard to permit compatibility with a wide range of off-the-shelf printed circuit boards for memory, terminal interfaces, microcomputer boards, graphics, and many other functions of digital systems. Of the circuit boards 214–226, only address sequencer board(s) 224 and response detector/training board 226 are custom designed. Video digitizer board 214, microcomputer board 220, controller interface board 218, and response memory board 222 are preferably commercially available circuit boards. In addition, image buffer board 216 is preferably a commercially available circuit board which is modified only so far as necessary to permit high speed access through the P2 port.

Externally, pattern processor 202 preferably interfaces to video camera 204 and video monitor 208 utilizing an industry-wide video standard. This permits use of a wide range of different cameras, monitors, and recorders with pattern processor 202.

In addition, controller interface board 218 utilizes the IEEE-488 standard, which is widely used in manufacturing environments for process control and testing. Pattern processor 202, therefore, is capable of use in conjunction with a wide variety of existing manufacturing systems which already utilize the IEEE-488 interface.

(A) Video Digitizer Board 214

Video digitizer board 214 digitizes the analog video signal from video camera 204 and makes the digitized data available for storage in image buffer board 216. An entire image of information (called a frame) is digitized thirty times a second. Video digitizer board 214 also converts the digitized data stored in image buffer board 216 back to an analog video signal for display on video monitor 208. Video monitor 208, therefore, displays the contents of image buffer board 216. The setup and control functions of video digitizer board 214 are directed from controller 206 through controller interface board 218 and the P1 port.

Image buffer board 216 grabs a frame of data from video digitizer board 214 at its option. A cable 236 is connected directly between on-board connectors of video digitizer board 214 and image buffer board 216 to permit the transfer of digitized data.

In one preferred embodiment of the present invention, video digitizer board 214 is a Model VAF-512 video digitizer circuit board from Matrox Company. The Model VAF-512 converts a frame of video into 128K points each having sixteen possible levels of intensity (i.e. sixteen grey levels).

In another embodiment, video digitizer board 210 is a Model VG-121 digitizer circuit board from Data Cube Corporation. The Model VG-121 converts a frame of video into 128K points and sixty-four grey levels. The VG-121 circuit board includes both a video digitizer and an image buffer on the same circuit board, and in that case Video digitizer board 214 and image buffer board 216 form a single circuit board.

(B) Image Buffer Board 216

Image buffer board 216 grabs a frame of data from video digitizer board 214, stores the data in its memory, and makes the data available to address sequencer board 224 through the P2 port. Each element (pixel) stored in image buffer board 216 is addressable through the address lines of the P2 port.

Many commercially available image buffer boards also provide some graphics functions. These graphics functions permit the image on video monitor 208 to be manipulated. For example, the operator may want to inspect subregions of an image more closely. With the assistance of graphics functions such as line drawing or zooming, the operator can more easily define subregions for more detailed inspection by pattern processor 202. In preferred embodiments, image buffer board 216 (with graphics functions) is a Matrox Model RGB Graph or a Data Cube Model VG121. The only modifications required to either of these boards for use in pattern processor 202 are those required to provide high speed access through the P2 ports.

(C) Controller Interface Board 218/Microcomputer Board 220

These two circuit boards work together to interface the standard IEEE-488 cable 232 from controller 206 to the multibus P1 port. Microcomputer board 220 intercepts commands from controller 206, via the controller interface 218, and loads the appropriate memory registers located on the various boards which are connected to port P1. In addition, microcomputer board 220 receives information from the boards and reformats it to send it to controller 206 via controller interface 218 and cable 232.

Microcomputer board 220 also provides signals through port P1 to control the refresh time of image buffer board 216. In addition, microcomputer board 220 provides signals in the form of control words via the P1 port to response detector/training board 226 to control double buffering swap times for the response detector. Further, microcomputer board 220 can be used to perform a variety of analysis tasks on the histogram data from response detector/training board 226.

(D) Response Memory Board 222

The response memory board 222 is preferably a commercially available multibus compatible read/write random access memory having a capacity of, for example, 512K words. Response memory board 222 is capable of being accessed at high speed through both the P1 and P2 multibus ports. Response memory board 222 is available, for example, from Microbar (Model DBR50).

(E) Address Sequencer Board 224

The contruction and operation of address sequencer board 224 is described in detail in the previously mentioned copending applications entitled PATTERN PROCESSING SYSTEM and ADDRESS SEQUENCER FOR PATTERN PROCESSING SYSTEM, and that description is incorporated herein by reference.

The operation of pattern processor 202 is based upon the generation of address loops which characterize an image input pattern. These address loops are used to identify the image input pattern which is present. The address loops are produced by means of address sequencer board 224, which generates an address stream containing a plurality of interleaved sequences of addresses. Each sequence is a function of input data of the pattern received in response to the addressing individual pixels of the pattern contained in image buffer board 216. Each address of the sequence is based upon a preceding address of the sequence and the input data received in response to that preceding address. The operation of address sequencer board 224 is consistent so that once an address of the sequence is repeated, the sequence is in an address loop and will remain in that loop as long as the image input pattern remains unchanged.

In preferred embodiments, address sequencer board 224 sequentially provides as the address stream both the present address for a sequence and the corresponding sequence identification number (or "sequencer ID number"). The "next" address in an address sequence is determined by a multibit number generated from a pseudorandom number generated based upon the present address and the grey level of the pixel corresponding to the present address. If the grey level of the present pixel is above a reference value, one combination of the number's bits will be used as the next address; if the grey level is equal to or below the reference value, another combination of the bits is used. Each grey level can therefore be represented as a binary image, i.e. either the pixel's value is above or below/equal the reference value. Each grey level image has at least one address sequence assigned to it. The characteristics of the pseudorandom number generator are varied as a function of the sequencer ID number, so that each address sequence is different.

Figure 2:
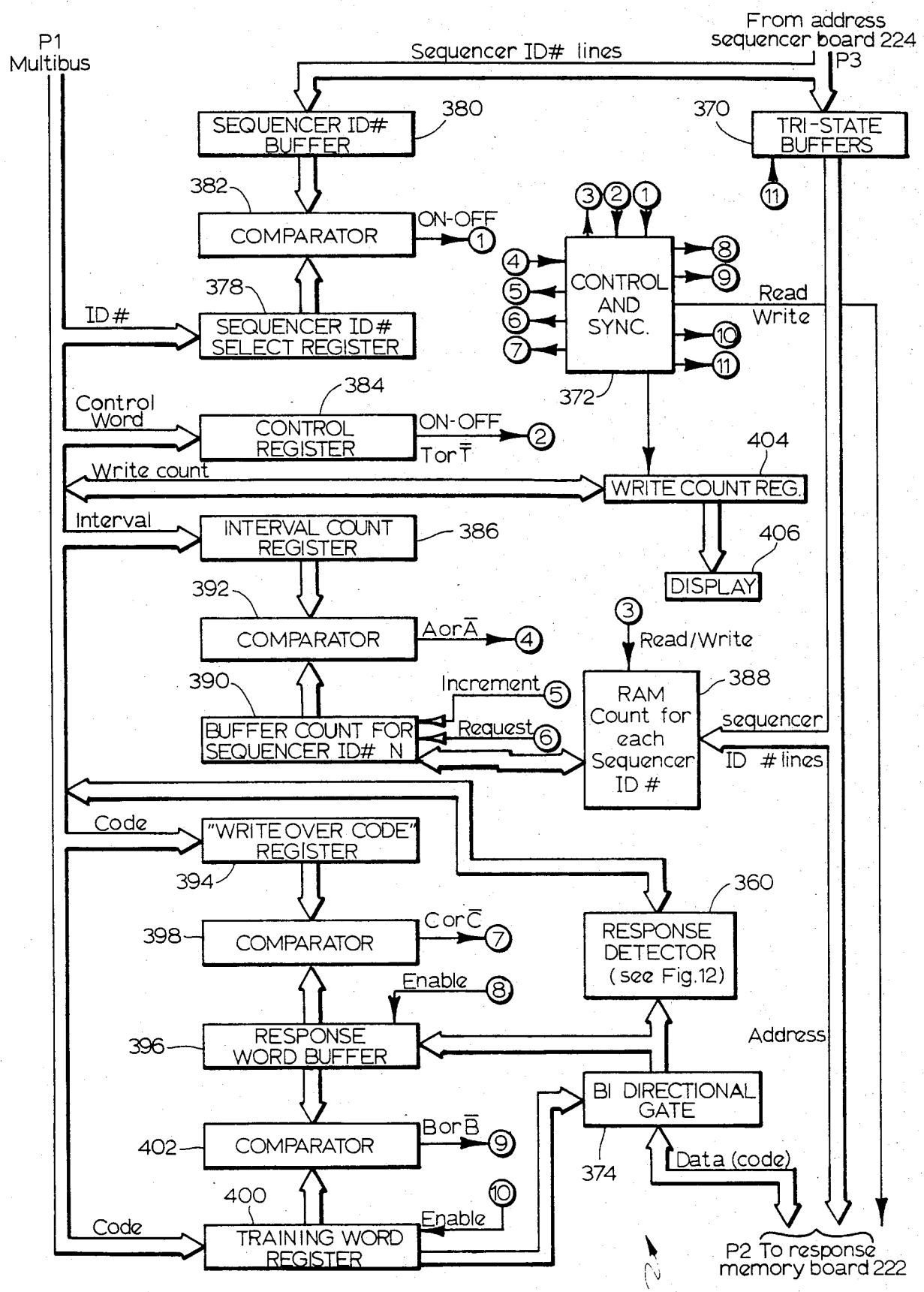
FIG. 2 is an electrical block diagram of the training controller of the system of FIG. 1.
Figure 3:
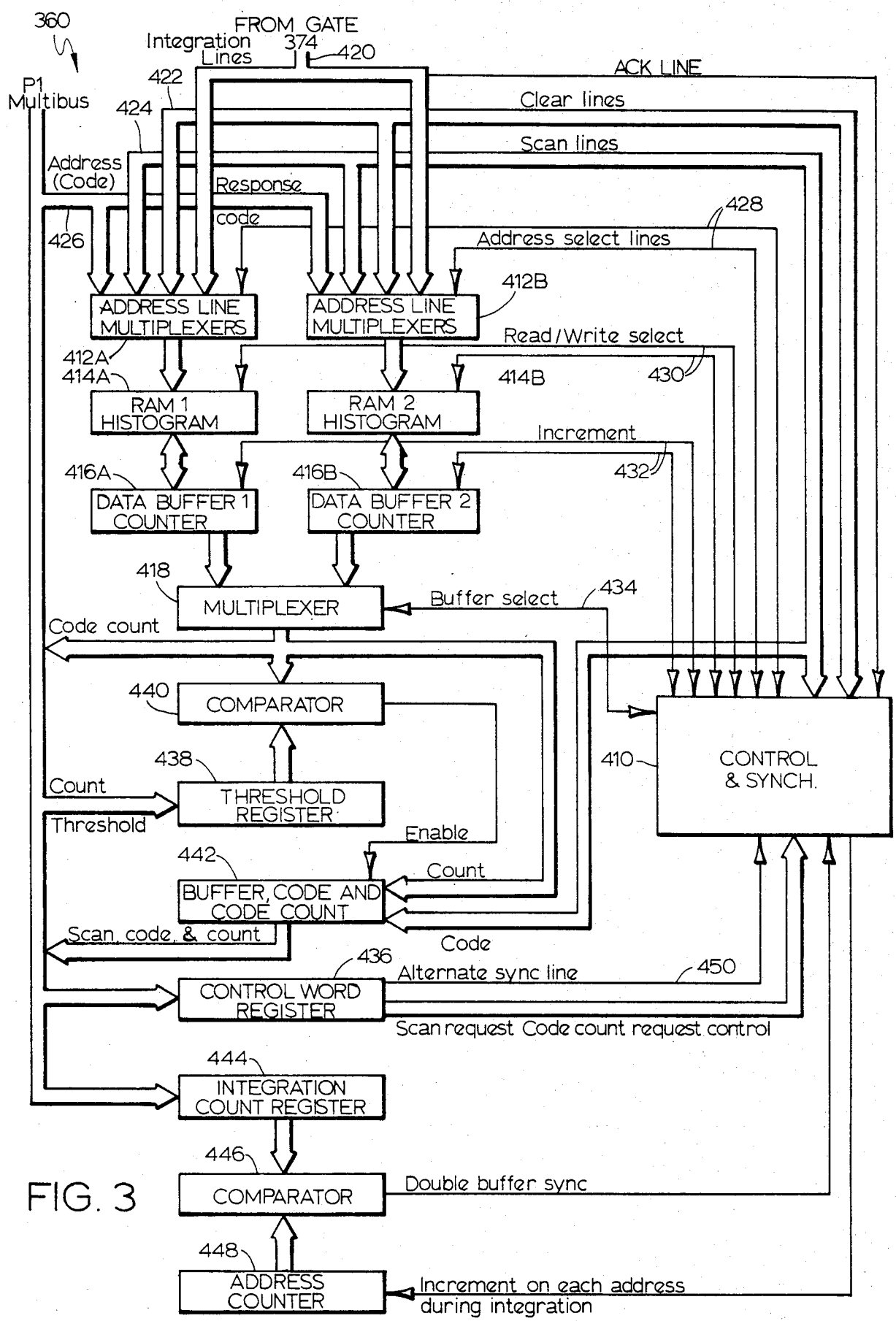
FIG. 3 is an electrical block diagram of the response detector of the system of FIG. 1.

(F) Response Detector/Training Board 226 (FIGS. 2 and 3)

Response detector/training board 226 consists of two main sections: training controller 350 shown in FIG. 2 and response detector 360 shown in FIG. 3. Training controller 350 writes to response memory board 222, while response detector 360 reads from response memory board 222.

To understand the operation of training controller 350 and response detector 360, the nature of the address stream from address sequencer board 224 (which is supplied on port P3) must first be considered. As described previously, address sequencer board 224 functions as though it consisted of many individual address sequencers operating in a multiplexed fashion. Each sequencer has an identifying number (i.e. the sequencer ID number) and each sequencer's output address is interleaved with the other output addresses. The P3 port lines include address lines, sequencer ID lines, and control lines. In one embodiment, for example, if sixteen address sequencers are active, the sequencer ID increments from "0" to "15" and back to "0" as each sequencer in turn places its output in the address stream. In general, each sequencer is associated with one grey level in the image, although it is possible (and in some cases very advantageous) to provide more than one sequencer per grey level. In such cases it may be advantageous to allow the grey level reference number to be outputted from the address sequencer as the sequence ID number. Each sequencer can be considered to be operating independently of the other sequencers and thus forming its own address loops.

Response detector/training board 226 receives the address stream and its associated control lines from address sequencer board 224 through the P3 port. The address stream occurs continuously (except during image frame grabbing if image buffer board 216 does not have double buffering capabilities). Response detector/training board 226 accepts and synchronizes with the address stream. When the address stream stops, response detector/training board 226 stops. If response detector/training board 226 stops, it has no effect on the address stream or on address sequencer board 224. In other words, response detector/training board 226 is entirely passive with respect to address sequencer board 224. This allows response detector/training board 226 to operate as an independent module.

(i) Training Controller 350 (FIG. 2)

The basic function of training controller 350 (FIG. 2) is to write training words (or codes) into response memory board 222. Most of the circuitry of training controller 350 involves determining when in the address stream from address sequencer board 224 the writing of training words should occur. Commands for setup and control originate from controller 206 and are sent via the multibus P1 port to various registers of training controller 350. Microcomputer board 220 controls the actual loading of the various registers of training controller 350, and the registers are essentially memory locations within the addressable memory space of microcomputer board 220.

Training controller 350 receives control lines, address lines, and sequencer ID number lines from address sequencer board 224 through the P3 port. Data, address and read/write lines are provided through the P2 port to response memory board 222.

Tristate buffers 370 are connected between port P3 and the address lines of port P2. When tristate buffers 370 are activated by control and synchronization circuit 372, they allow an address (or addresses) from port P3 to pass through to port P2, and thus on to response memory board 222.

In a preferred embodiment, control and synchronization circuit 372 is a programmable read only memory (PROM) which stores microcode. The PROM acts as a finite state machine which selects the next state of its output lines as a function of the current combination of states of its input lines.

Bidirectional gate 374 interfaces training controller 350 and response detector 360 with the data lines of the P2 port. The read/write control line 376 from control and synchronization circuit 372 is supplied through the P2 port to response memory board 222, and determines whether data is flowing from training controller 350 to response memory board 222, or whether data is flowing from response memory board 222 through bidirectional gate 374 to response detector 360.

Sequencer ID number select register 378 holds the sequencer ID number whose address output is currently being trained. The ID number is loaded into register 378 from the P1 port, and is compared with the current sequencer ID number in sequencer ID number buffer 380 by comparator 382. The output of comparator 382 is an ON/OFF signal which is supplied to control and synchronization circuit 372. When the ON/OFF signal indicates an ON state, tristate buffers 370 are turned on by control and synchronization circuit 372 and the address or addresses received from port P3 are passed through to port P2 and response memory board 222.

The effect of register 378, buffer 380 and comparator 382 is to allow operation by a single sequencer of address sequencer board 224, the address of which is interleaved in the address stream with addresses from other sequencers. As stated previously, address sequencer board 224 operates as multiple address sequencers and interleaves their addresses in the address stream. The ON/OFF signal from comparator 382 permits training or response detection to occur using only one sequencer at a time, and thus permits important diagnostic information to be gathered. In normal operation, the ON/OFF signal is forced ON, enabling the entire stream to pass through tristate buffers 370.

Control register 384 receives a control word from the P1 port, and sets up various options. The output of control register 384 is supplied to control and synchronization circuit 372. One bit in the control word controls an ON/OFF signal, which determines whether tristate buffers 370 are turned on or turned off. Another bit of the control word, designated as T and $\overline{T}$ causes control and synchronization circuit 372 to place training controller 350 in or out of the training mode. When the bit is "T", the training mode is in operation, and training words can be written into response memory board 222. On the other hand, when the bit is "$\overline{T}$", the training mode is not in operation, and training words cannot be written into response memory board 222.

Interval count register 384 controls the number of response memory locations used during training. Only as many memory locations need to be used as are required to distinguish which address loop each address sequence is in. Register 386 identifies the address interval in the address stream (considering the address stream from each address sequencer ID number separately) that the training word is assigned to response memory board 222. For example, if register 386 is set to ten, then every tenth address from each sequencer will have the training word assigned to that address in response memory board 222.

RAM 388 contains a memory location for each sequencer ID number and, in fact, the ID number serves as the address to RAM 388. Each location serves as a counter to count the number of occurrences of each sequencer ID number. The contents of RAM 388 are read into buffer 390 and are compared to the contents of interval count register 386 by comparator 392. The output of comparator 392 is "A" if the count for occurrences of a particular sequencer ID number N in buffer 390 is less than the interval count contained in register 386. Conversely, the output of comparator 392 is "A" if the count for occurrences of sequencer ID number N contained in buffer 390 is greater than or equal to the interval count contained in register 386. The output (A or $\overline{A}$) of comparator 390 is supplied to control and synchronization circuit 372.

The count for each sequencer ID number can be incremented or reset by control and synchronization circuit 372, which supplies Increment and Reset inputs to buffer 390. In addition, the count for each sequencer ID number can be written back to RAM 388 by control and synchronization circuit 372 through a Read/Write input to RAM 388.

Write over code register 394 identifies a code which has already been written into response memory board 222 but which can be written over by a new training word. This feature is useful as response memory board 222 becomes filled, and when corrections are to be made to existing codes stored in response memory board 222. The response word is read directly from the response memory board 222 as it is addressed by the address stream, and is supplied through bidirectional gate 374 to response word buffer 396. Comparator 398 compares the response word contained in buffer 396 with the write over code contained in register 394. The output of comparator 398, which is supplied to control and synchronization circuit 372 is "C" if the current response word equals the write over code. The output of comparator 398 is "$\overline{C}$" if the current response word does not equal the write over code.

Under normal conditions, the write over code is the code to designate an empty location in response memory board 222. In other words, the write over code is the same code used to preset the entire response memory board 222. The write over feature can be disabled, allowing any response word to be written over.

Training word register 400 holds the training code to be written to response memory board 322. The training code in training word register 400 is compared to the current response word in buffer 396 by comparator 402, to determine if the training code is already stored at the currently addressed location. If the training code is already stored at this location, the count for the current sequencer ID number is reset and stored in RAM 388. This helps maintain the desired interval between assignment of the training code to response memory board 222.

The output of comparator 402, which is supplied to control and synchronization circuit 372, is "B" if the training code equals the current response word. The output of comparator 402 is "$\overline{B}$" if the training code is not equal to the current response word.

Write count register 404 can be read from or written to by controller 206 through the multibus P1 port. Register 404 indicates how many times a training code has been written to response memory board 222. This number is also displayed by display 406. The number contained in register 404 is important, because it can indicate the approximate length of the address loop for each address sequencer ID number, if the interval size is known and only one sequencer ID number is active at a time. For example, if the assignment interval set by interval count register 386 is ten, if the sequencer ID Number "N" is activated, and if the number in register 404 is thirty, then the address loop length for sequencer ID Number N is approximately three hundred. The write count contained in register 404 may not always indicate loop length exactly, due to overlap of different loops. If does, however, provide an approximate measure of loop length. The write count contained in register 404 can also be accumulated by controller 206 to indicate how much of response memory board 222 is being used.

Control and synchronization circuit 372 causes a training code to be written to response memory board 222 when the following condition is met: A AND C AND T. In other words, this means that the count for occurrence of address sequencer ID Number N contained in buffer 390 is greater than or equal to interval count contained in register 386; and the current response word contained in buffer 396 equals the write over code contained in register 394; and training controller 350 is in the training mode.

Control and synchronization circuit 372 clears the count in buffer 390 and writes to RAM 388 if either (1) a training code is written to response memory board 222, or (2) the same training code is already at the current address location in response memory board 222. This condition can be expressed by: A AND C AND T OR B, where B is the output of comparator 402, and indicates that the training code contained in training word register 400 equals the response word contained in buffer 396.

(ii) Response Detector 360 (FIG. 3)

Response detector 360 determines (i.e. detects) the identity (i.e. response) of the image presented to pattern processor 202. It does so by continually reading the contents of the response memory board 222 which are addressed by the address stream from address sequencer board 224 and by identifying the most frequently occurring codes being read. If the image present at image buffer board 216 is the same or similar to the image presented during training, then the address stream will be similar, and the response detector 360 will identify the code which was used during training. For a static image, the address stream will always be repetitive and will contain a small subset of the total set of possible addresses. As long as the image is present, therefore, the same set of addresses will be accessed and the same response code will be detected.

Response detector 360 receives through bidirectional gate 374 (FIG. 2) only the contents of response memory board 222 which are addressed by the address stream. Response detector 360 does not deal with the address stream itself. As the address stream is controlled (for example turned on or off with tristate buffers 370 of FIG. 2), the response codes sent to response detector 360 through bidirectional gate 374 also turn on and off.

Response detector 360 is set up and controlled by commands which are sent from controller 206 through port P1 and which are stored in various registers of response detector 360. The registers are within the addressable memory space of microcomputer board 220, and read and write operations occur through the multibus P1 port. The operation of response detector 360 is synchronized and controlled by control and synchronization circuit 410. Among the functions controlled by circuit 410 include clearing selected addresses, scanning addresses, and synchronization of the other circuits. In preferred embodiments, control and synchronization circuit 410 is a PROM containing microcode which operates as a finite state machine. The next state of the outputs of circuit 410 are a function of the current combination of states of its inputs.

Response detector 360 uses a double buffering arrangement for receiving the response code read out from response memory board 222 and for providing a response code to controller 206 through the P1 port. The double buffering arrangement includes address line multiplexers 412A and 412B, first and second random access memories (RAMS) 414A and 414B, data buffers 416A and 416B, and multiplexer 418.

First and second RAMs 414A and 414B are the key components in response detector 360. First and second RAMS 414A and 414B operate in a double buffer (i.e. flipflop) scheme so that one RAM is always available for response inquiries from controller 206 while the other RAM is processing the response code stream which is being received from response memory board 222 through bidirectional gate 374 (FIG. 2). The response code stream serves as a sequence of addresses for RAMs 414A and 414B. For example, if there are 256 possible different training codes, there will also be 256 possible response codes. In this example, first and second RAMs 414A and 414B preferably are 256×16 bit RAMs, and each response code addresses a specific location in RAM 414A (or 414B), depending on which RAM is processing the response codes. That RAM increments the contents of each addressed location, where the address is the response code. Since the occurrence of a response code increments its location in RAM 414A (or 414B), a histogram is formed. The period over which the processing RAM 414A (or 414B) is accumulating counts is called the integration count, and lines 420 which provide the response code stream from bidirectional gate 374 are called the integration lines.

There are four ways to address RAMs 414A and 414B: integration lines 420, clear lines 422, scan lines 424, and address lines 426. Lines 420, 422, 424 and 426 are all provided to address line multiplexers 412A and 412B. Control and synchronization circuit 410 controls operation of multiplexers 412A and 412B through address select lines 428.

As stated previously, integration lines 420 provide the response code stream which was supplied from response memory board 222 through bidirectional gate 374. Clear lines 422 are received from control and synchronization circuit 410, and cycle through the RAM addresses to clear the contents of RAM 414A or 414B. Scan lines 424 are also received from control and synchronization circuit 410. They permit control and synchronization circuit 410 to sequence through the RAM 414A, 414B for the purpose of sending the contents of the RAMs to controller 206. Address lines 426 are received from port P1 of the multibus, and permit direct addressing of RAMs 414A and 414B by controller 206. RAMs 414A and 414B are preferably included in the memory space of microcomputer board 220.

Typically, one RAM (for example 414A) is clearing its memory and then accumulating counts (i.e. integrating) while the other RAM (in this example 414B) is available for access by controller 206 via multibus port P2. The selection of which RAM is integrating and which RAM is available for access by controller 206 is controlled by control and synchronization circuit 410 by means of address select lines 428, read/write select lines 430, increment lines 432, and buffer select line 434. Controller 206 provides control commands to control and synchronization circuit 410 by loading a control word through port P1 into control word register 436.

Controller 206 can directly access RAM 414A or 414B by sending the response code (which corresponds to an address of the RAM 414A or 414B), and in that case response detector 360 sends back the number of times that code has occurred during the last integration period. Alternatively, RAM 414A or 414B can be accessed by a scan request as part of the control word loaded in control word register 436. In that case, response detector 360 sends back response codes and their number of occurrences if the number is above a preset threshold.

Threshold register 438, comparator 440, and buffer 442 are used during a scan operation, when controller 206 is requesting an indication of the identity of the image. During the scan operation, response detector 360 sends back through buffer 442 all codes which had a frequency of occurrence during the last integration period which was greater than the count threshold value contained in threshold register 438. The count threshold is provided by controller 206 through port P1. Each time comparator 440 determines that the count contained in multiplexer 418 is greater than the count threshold contained in threshold register 438, it provides an enable to buffer 442. The particular address from scan lines 424 and the count from multiplexer 418 are loaded into buffer 442, where they can be read by controller 206 through port P1.

The count threshold is clearly linked to the time over which counts are accumulated (ie. the integration time). Controller 206 specifies the integration time by loading an integration count into integration count register 444. Comparator 446 compares the integration count with an address count contained in address counter 448. The output of comparator 446 is a double buffer sync signal which is supplied to control and synchronization circuit 410. Address counter 448 is incremented by control and synchronization circuit 410 for each address which is received on integration lines 420. When the address count in counter 448 equals the integration count contained in register 444, the double buffer sync signal is supplied by comparator 446. This causes control and synchronization circuit 410 to end the integration period by reversing the double buffering scheme.

It is important to note that the integration count in most cases represents a real time interval, because the address rate (i.e. the rate of response codes received on integration lines 420) is constant. This direct relationship to real time cannot always be guaranteed, however, because the response code stream may be interrupted by a refresh of image buffer board 216 from camera 204 (in the case in which video camera 204 is not double buffered) or by a command from controller 206 which stops the address stream from address sequencer board 224.

To avoid the somewhat uncertain real time nature of the integration period, an alternative external synchronization is possible by means of alternate sync line 450, which is supplied from control register 436 to control and synchronization circuit 410. The control word which is loaded into control word register 436 preferably includes a bit which initiates a swap of the double buffering scheme. In general, this is synchronized with the frame rate of camera 204. As discussed previously, the control word is received from controller 206 and is loaded into control word register 436 by microcomputer board 220 through port P1.

(G) Increased Vocabulary and Resolution Capabilities

One important advantage of pattern processor 202 described in FIGS. 1 through 3 is the modular nature of its architecture. As discussed previously, response detector/training board 226 and response memory 222 are entirely passive with respect to address sequencer board 224. As a result, larger response vocabularies are possible by use of multiple response detector/training boards 226 and multiple corresponding response memory boards 222. Since the modules operate independently, they can all be placed on the multibus to provide additional response memory space and thus permit more space for different training codes.

Increased resolution can also be achieved by use of multiple image buffer boards 216 and address sequencer boards 224. Resolution is increased because additional sample points are continually being sampled from the same image, and the total address stream is therefore more sensitive to changes in fewer pixels (image element). Each additional module which includes an image buffer board 216 and an address sequencer board 224 normally requires an additional response detector/training board 226 and response memory board 222. This is because the response detector/training board 226 and the response memory board 222 described in FIGS. 1 through 3 accept only one address stream. The addition of another response detector/training board 226 and response memory board 222 in order to achieve greater resolution also provides a larger response vocabulary.

(H) Conclusion

The pattern processor of the present invention is an extremely powerful tool for a wide variety of different pattern recognition applications. The generation of address loops by the address sequencer provides a dramatic reduction in data which permits the association of a desired response with an image input. As a result, the present invention provides much faster response to complex input images than has been possible using conventional image processing techniques.

Although the present invention has been described with reference to preferred embodiments, workers skilled in the art will recognize that changes may be made in form and detail without departing from the spirit and scope of the invention.

What is claimed is:

1. A pattern processing system comprising:
   addressable means for providing an input value representative of a pattern in response to an address;
   address sequencer means for providing an address stream containing at least one sequence of addresses in which each address of the sequence is determined by a preceding address and the input value provided by the addressable means in response to the preceding address so that the sequence contains an address loop which characterizes the pattern;
   read/write response memory means for storing codes in addressable locations, the response memory being addressable by the address stream to permit writing of the codes into addressed locations and to permit reading of the codes from addressed locations;
   means for providing a training code to be associated with the pattern during a training mode;
   means for providing a mode select signal which selects the training mode;
   training controller means for causing the training code to be written into selected addressable locations of the response memory means during the training mode, the training controller means comprising:
   means for storing the training code;
   means for counting addresses in the sequence;
   means for causing the stored training code to be written into an addressed location of the response memory means when the mode select signal has selected the training mode and a predetermined number of addresses have been counted; and
   means for resetting the count of addresses when the stored training code has been written into the response memory means.

2. The system of claim 1 wherein the training controller means further comprises:
   means for providing a write over code which represents a code which, if read out from the response memory means, can be replaced by the training code;
   means for comparing the write over code and the code read from the addressed location; and
   wherein the means for causing the training code to be written into an addressed location causes the training code to be written only if the comparison indicates that the code read from the addressed location can be replaced.

3. The system of claim 1 wherein the training controller means further comprises:
   write count means for maintaining a count which represents a total number of locations of the response memory means into which the training code has been written.

4. The system of claim 2 wherein the training controller means further comprises:
   means for providing an interval count indicative of the predetermined interval;
   means for providing a first comparator signal when the counted occurrences of addresses in the sequence attains the interval count; and
   wherein the means for causing the training code to be written is responsive to the first comparator signal.

5. The system of claim 1 wherein the training controller means further comprises:
   means for comparing the code read from the addressed location with the stored training code; and
   means for selectively resetting the count of addresses as a function of the comparison of the code read and the stored training code.

6. The system of claim 1 wherein the address stream includes a plurality of interleaved sequences of addresses; and wherein the means for counting addresses maintains a count for each sequence.

7. The system of claim 6 wherein each address of the address stream has associated therewith a sequence identification number which indicates the sequence of which the address forms a part; and wherein the means for counting counts occurrences of the sequence identification numbers to provide a count of addresses for each sequence.

8. The system of claim 7 and further comprising:
   means for providing a selected sequence number indicative of a selected sequence of the plurality;

comparator means for providing a signal which indicates whether the selected sequence number and the sequence identification number have a predetermined relationship; and means for permitting addresses of the address stream to address the response memory as a function of the signal from the comparator means.

9. A pattern processing system comprising:

addressable means for providing input values representative of a pattern in response to addresses;

address sequencer means for providing an address stream which includes a plurality of interleaved sequences of addresses which are a function of input values received from the addressable means in response to the addresses, each address of the address stream having a sequence identification number associated therewith which indicates the sequence of which the address forms a part;

read/write response memory means for storing codes in addressable locations by the address stream, the read/write response memory means permitting codes to be written to and read from the address locations;

means for providing a training code to be associated with the pattern during a training mode; and training controller means for causing the training code to be written selectively into locations of the response memory means addressed by the address stream during the training mode, the training controller means comprising:

interval count means for providing an interval count representative of a predetermined interval in the sequences of addresses;

counter means for counting occurrences of each sequence identification number in the address stream;

first comparator means for comparing the interval count with the occurrence count for the sequence identification number associated with the address of the address stream and providing a first comparator output when the occurrence count attains the interval count; and control means for controlling writing of the training code into the read/write response memory means as a function of the first comparator output.

10. The pattern processing system of claim 9 further comprising:

response buffer means for receiving the code read out from the location of the memory means addressed by the address; and second comparator means for providing a second comparator output signal which indicates whether the code read out from the memory means is different from the training code; and wherein the control means also controls writing of the training code into the response memory means as a function of the second comparator output signal.

11. The system of claim 10 and further comprising:

means for providing a write/over code;

third comparator means for comparing the write/over code and the code read out and providing a third comparator output which indicates that the code read out can be replaced by the training code; and wherein the control means also controls writing of the training code into the response memory means as a function of the third comparator output signal.

* * * * *